(12) United States Patent
Guo

(10) Patent No.: US 10,920,060 B2
(45) Date of Patent: Feb. 16, 2021

(54) MULTI-STAGE POLYMER COMPOSITION AND FILMS MADE THEREFROM

(71) Applicant: Rohm and Haas Company, Collegeville, PA (US)

(72) Inventor: Hailan Guo, Warrington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 80 days.

(21) Appl. No.: 16/096,743

(22) PCT Filed: May 18, 2017

(86) PCT No.: PCT/US2017/033311
§ 371 (c)(1),
(2) Date: Oct. 26, 2018

(87) PCT Pub. No.: WO2017/205177
PCT Pub. Date: Nov. 30, 2017

(65) Prior Publication Data
US 2019/0119484 A1    Apr. 25, 2019

Related U.S. Application Data

(60) Provisional application No. 62/340,600, filed on May 24, 2016.

(51) Int. Cl.
| | | |
|---|---|---|
| *C08F 285/00* | (2006.01) | |
| *C08J 5/18* | (2006.01) | |
| *C08F 220/14* | (2006.01) | |
| *C08F 220/18* | (2006.01) | |
| *C08L 33/06* | (2006.01) | |
| *C09J 151/00* | (2006.01) | |
| *C08F 2/38* | (2006.01) | |

(52) U.S. Cl.
CPC ............ *C08L 33/066* (2013.01); *C08F 2/38* (2013.01); *C08F 285/00* (2013.01); *C08J 5/18* (2013.01); *C09J 151/003* (2013.01); *C08J 2333/06* (2013.01); *C08J 2433/06* (2013.01); *C08L 2203/16* (2013.01); *C08L 2205/025* (2013.01); *C08L 2205/035* (2013.01); *C08L 2207/53* (2013.01); *C08L 2312/00* (2013.01)

(58) Field of Classification Search
CPC ........ C08L 33/066; C08L 33/12; C08L 33/06; C08L 2203/16; C08L 2205/025; C08L 2205/035; C08L 2312/00; C08L 51/003; C08F 2/38; C08F 285/00; C08F 2/001; C08F 110/14; C08F 212/08; C08F 220/06; C08F 220/14; C08F 220/18; C08F 220/20; C08F 220/1804; C08J 5/18; C08J 151/003; C08J 2333/06; C08J 2433/06; C08J 2351/00; C09J 151/003; B29D 7/01; B32B 27/00; B32B 27/42
USPC ........................................................ 523/201
See application file for complete search history.

(56) References Cited

U.S. PATENT DOCUMENTS

| | | | | |
|---|---|---|---|---|
| 4,508,875 A | * | 4/1985 | Kishida | ................. C08F 285/00 525/308 |
| 5,206,299 A | * | 4/1993 | Oshima | ................. C08F 285/00 106/38.2 |
| 5,298,559 A | * | 3/1994 | Fujii | ..................... C08F 285/00 524/504 |
| 6,710,161 B2 | | 3/2004 | Bardman et al. | |
| 8,137,803 B2 | | 3/2012 | Kitaike et al. | |
| 9,156,976 B2 | | 10/2015 | Guo et al. | |
| 10,040,915 B2 | * | 8/2018 | Guo | ..................... C08F 220/10 |
| 2015/0183944 A1 | | 7/2015 | Guo et al. | |

* cited by examiner

*Primary Examiner* — Hannah J Pak
(74) *Attorney, Agent, or Firm* — Brian L. Mutschler

(57) ABSTRACT

Provided are multi-stage polymer compositions comprising (a) cross-linked core comprising polymerized units derived from (i) alkyl(meth)acrylate monomers, and (ii) one or more cross-linking monomers, graft-linking monomers, and combinations thereof, (b) a first intermediate layer comprising polymerized units derived from (i) one or more alkyl(meth)acrylate monomers, and (ii) cross-linking monomers, graft-linking monomers, and combinations thereof, (c) a second intermediate layer comprising polymerized units derived from (i) one or more alkyl(meth)acrylate monomers, styrenic monomers, and combinations thereof, and (ii) one or more chain transfer agents, and (d) a shell comprising polymerized units derived from (i) alkyl(meth)acrylate monomers, styrenic monomers, and combinations thereof, (ii) one or more monomers selected from the group consisting of acid functionalized monomers, hydroxyl-functionalized monomers, and combinations thereof, and (iii) optionally, of one or more chain transfer agents.

9 Claims, No Drawings

MULTI-STAGE POLYMER COMPOSITION AND FILMS MADE THEREFROM

FIELD OF THE INVENTION

This invention relates generally to multi-stage polymer compositions and films made therefrom.

BACKGROUND

Automobile and architectural windows require flexible, transparent, and weather resistant plastic resins and films. Existing commercial resins containing polyvinyl butyral ("PVB") have been used, but require a plasticizer to achieve adequate optical, mechanical, and adhesion to glass properties. Due to the presence of plasticizer, however, the formulated PVB sheets must be packaged and stored in a low temperature environment prior to glass lamination to limit the adsorption of moisture by the plasticizers. Moisture absorbed by the sheet can introduce bubbling during the autoclave lamination process, and delamination may occur over time for finished glass laminates.

Multi-stage acrylic polymer films have been utilized in the art for a variety of indoor and outdoor products. For example, US 2015/0183944 A1 discloses certain multi-stage polymer compositions and films prepared therefrom comprising a cross-linked core, intermediate layer, and outermost layer. The prior art does not, however, disclose a multi-stage acrylic polymer according to the present invention, which achieves satisfactory optical, mechanical, and adhesive properties required by glass interlayer lamination.

Accordingly, there is a film for a glass laminate interlayer that do not suffer from the drawbacks of the prior art, namely, that retain flexibility and clarity, while not requiring a plasticizer or specialized pre-lamination storage and handling.

STATEMENT OF INVENTION

One aspect of the invention provides a polymer composition comprising a multi-stage polymer comprising (a) 25 to 45 weight % of a cross-linked core, based on the total weight of the multi-stage polymer, comprising polymerized units derived from (i) 95 to 99.9 weight % of one or more alkyl(meth)acrylate monomers, and (ii) 0.1 to 5 weight % of one or more cross-linking monomers, graft-linking monomers, and combinations thereof, based on the total weight of the cross-linked core, (b) 25 to 45 weight % of a first intermediate layer, based on the total weight of the multi-stage polymer, comprising polymerized units derived from (i) 95 to 100 weight % of one or more alkyl(meth)acrylate monomers, and (ii) 0 to 5 weight % of cross-linking monomers, graft-linking monomers, and combinations thereof, based on the total weight of the first intermediate layer, (c) 5 to 25 weight % of a second intermediate layer, based on the total weight of the multi-stage polymer, comprising polymerized units derived from (i) 98.0 to 100 weight % of one or more alkyl(meth)acrylate monomers, styrenic monomers, and combinations thereof, and (ii) 0 to 2 weight % of one or more chain transfer agents, based on the total weight of the second intermediate layer, and (d) 5 to 25 weight % of a shell, based on the total weight of the multi-stage polymer, comprising polymerized units derived from (i) 84 to 98 weight % of one or more alkyl(meth)acrylate monomers, styrenic monomers, and combinations thereof, (ii) 2 to 16 weight % of one or more monomers selected from the group consisting of acid functionalized monomers, hydroxyl-functionalized monomers, and combinations thereof, and (iii) 0 to 2 weight % of one or more chain transfer agents, based on the total weight of the shell.

In another aspect, the invention provides polymer composition comprising a multi-stage polymer comprising (a) 30 to 40 weight % of a cross-linked core, based on the total weight of the multi-stage polymer, comprising polymerized units derived from (i) 95 to 99.9 weight % of butyl acrylate, and (ii) 0.1 to 5 weight % of 1,3-butandeiol diacrylate and allyl methacrylate, based on the total weight of the cross-linked core, (b) 30 to 40 weight % of a first intermediate layer, based on the total weight of the multi-stage polymer, comprising polymerized units derived from (i) 97 to 99.9 weight % of butyl acrylate and methyl methacrylate, and (ii) 0.1 to 3 weight % of allyl methacrylate, based on the total weight of the first intermediate layer, (c) 10 to 20 weight % of a second intermediate layer, based on the total weight of the multi-stage polymer, comprising polymerized units derived from (i) 98.5 to 99.5 weight % of butyl acrylate and methyl methacrylate, and (ii) 0.5 to 1.5 weight % of 1-doecanethiol, based on the total weight of the second intermediate layer, and (d) 10 to 20 weight % of a shell, based on the total weight of the multi-stage polymer, comprising polymerized units derived from (i) 85 to 94 weight % of butyl acrylate and methyl methacrylate, (ii) 3 to 14 weight % of one or more monomers selected from the group consisting of acrylic acid, hydroxyethyl methacrylate, and combinations thereof, and combinations thereof, and (iii) 0.5 to 1.5 weight % of 1-dodecanethiol, based on the total weight of the shell.

Another aspect of the present invention provides an article of manufacture comprising a polymer composition comprising a multi-stage polymer comprising (a) 25 to 45 weight % of a cross-linked core, based on the total weight of the multi-stage polymer, comprising polymerized units derived from (i) 95 to 99.9 weight % of one or more alkyl(meth) acrylate monomers, and (ii) 0.1 to 5 weight % of one or more cross-linking monomers, graft-linking monomers, and combinations thereof, based on the total weight of the cross-linked core, (b) 25 to 45 weight % of a first intermediate layer, based on the total weight of the multi-stage polymer, comprising polymerized units derived from (i) 95 to 100 weight % of one or more alkyl(meth)acrylate monomers, and (ii) 0 to 5 weight % of cross-linking monomers, graft-linking monomers, and combinations thereof, based on the total weight of the first intermediate layer, (c) 5 to 25 weight % of a second intermediate layer, based on the total weight of the multi-stage polymer, comprising polymerized units derived from (i) 98.0 to 100 weight % of one or more alkyl(meth)acrylate monomers, styrenic monomers, and combinations thereof, and (ii) 0 to 2 weight % of one or more chain transfer agents, based on the total weight of the second intermediate layer, and (d) 5 to 25 weight % of a shell, based on the total weight of the multi-stage polymer, comprising polymerized units derived from (i) 84 to 98 weight % of one or more alkyl(meth)acrylate monomers, styrenic monomers, and combinations thereof, (ii) 2 to 16 weight % of one or more monomers selected from the group consisting of acid functionalized monomers, hydroxyl-functionalized monomers, and combinations thereof, and (iii) 0 to 2 weight % of one or more chain transfer agents, based on the total weight of the shell. In certain embodiments, the article of manufacture is a film. In certain embodiments, the article of manufacture is a sheet.

DETAILED DESCRIPTION

The inventors have now surprisingly found that polymer compositions comprising a multi-stage polymer comprising a cross-linked core including alkyl(meth)acrylate monomers and cross-linking and/or graft-linking monomers, a first intermediate layer including alkyl(meth)acrylate monomers and cross-linking and/or graft-linking monomers, a second intermediate layer including alkyl(meth)acrylate monomers and chain transfer agents, and a shell including alkyl(meth) acrylate monomers, chain transfer agents, and one or more of acid functionalized and hydroxyl functionalized monomers, provide satisfactory optical, mechanical, and adhesive properties required by glass interlayer lamination while not requiring a plasticizer or specialized pre-lamination storage and handling.

As used herein, the term "polymer" refers to a polymeric compound prepared by polymerizing monomers, whether of the same or a different type. The generic term "polymer" includes the terms "homopolymer," "copolymer," "terpolymer," and "resin." As used herein, the term "polymerized units derived from" refers to polymer molecules that are synthesized according to polymerization techniques wherein a product polymer contains "polymerized units derived from" the constituent monomers which are the starting materials for the polymerization reactions. As used herein, the term "(meth)acrylate" refers to either acrylate or methacrylate or combinations thereof, and the term "(meth) acrylic" refers to either acrylic or methacrylic or combinations thereof.

As used herein, the term "phr" means per hundred parts resin or polymer solids. As used herein, the term "molecular weight" or "weight average molecular weight" or "$M_w$" refers to the weight average molecular weight of a polymer as measured by gel permeation chromatography ("GPC"), for acrylic polymers against polystyrene calibration standards following ASTM D5296-11 (2011), and using tetrahydrofuran ("THF") as the mobile phase and diluent. As used herein, the term "particle size" means the weight average particle size of the emulsion (co)polymer particles as measured using a Brookhaven BI-90 Particle Sizer.

As used herein, the terms "glass transition temperature" or "$T_g$" refers to the temperature at or above which a glassy polymer will undergo segmental motion of the polymer chain. Glass transition temperatures of a copolymer can be estimated by the Fox equation (*Bulletin of the American Physical Society*, 1 (3) Page 123 (1956)) as follows:

$$1/T_g = w_1/T_{g(1)} + w_2/T_{g(2)}$$

For a copolymer, $w_1$ and $w_2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n/T_{g(n)}$). The glass transition temperatures of the homopolymers may be found, for example, in the "Polymer Handbook," edited by J. Brandrup and E. H. Immergut, Interscience Publishers. The $T_g$ of a polymer can also be measured by various techniques, including, for example, differential scanning calorimetry ("DSC"). As used herein, the phrase "calculated $T_g$" shall mean the glass transition temperature as calculated by the Fox equation.

The inventive polymer compositions contain a multi-stage polymer including a cross-linked core, a first intermediate layer, a second intermediate layer, and a shell. In certain embodiments, the cross-linked core is present in the multi-stage polymer in an amount of from 25 to 45 weight %, preferably of from 30 to 40 weight %, and more preferably of from 32 to 38 weight %, based on the total weight of the multi-stage polymer. In certain embodiments, the first intermediate layer is present in the multi-stage polymer in an amount of from 25 to 45 weight %, preferably of from 30 to 40 weight %, and more preferably of from 32 to 38 weight %, based on the total weight of the multi-stage polymer. In certain embodiments, the second intermediate layer is present in the multi-stage polymer in an amount of from 5 to 25 weight %, preferably of from 10 to 20 weight %, and more preferably of from 12 to 18 weight %, based on the total weight of the multi-stage polymer. In certain embodiments, the shell is present in the multi-stage polymer in an amount of from 5 to 25 weight %, preferably of from 10 to 20 weight %, and more preferably of from 12 to 18 weight %, based on the total weight of the multi-stage polymer.

The cross-linked core of the inventive multi-stage polymer comprises polymerized units derived from one or more alkyl(meth)acrylate monomers. The alkyl(meth)acrylate monomers comprise linear and branched alkyl(meth)acrylates wherein the alkyl group has from 1 to 12 carbon atoms. Suitable alkyl(meth)acrylate monomers include, for example, methyl methacrylate, ethyl acrylate, butyl acrylate, butyl methacrylate, ethyl hexyl acrylate, cyclopentyl acrylate, cyclohexyl acrylate, benzyl acrylate, benzyl methacrylate, and isooctylacrylate. In certain preferred embodiments, the alkyl(meth)acrylate monomers of the cross-linked core comprise butyl acrylate. In certain embodiments, the alkyl (meth)acrylate monomers are present in the cross-linked core in an amount of from 95 to 99.9 weight %, preferably of from 97 to 99.5 weight %, and more preferably of from 98 to 99 weight %, based on the total weight of the cross-linked core.

The cross-linked core of the inventive multi-stage polymer further comprises polymerized units derived from one or more cross-linking monomers, graft-linking monomers, and combinations thereof. Suitable cross-linking and graft-linking monomers include, for example, butanediol di(meth) acrylate, ethylene glycol di(meth)acrylate, divinyl benzene, diethylene glycol di(meth)acrylate, diallyl maleate, ally acrylate, allyl methacrylate, diallyl phthalate, triallyl phthalate, and trimethylolpropane tri(meth)acrylate. In certain embodiments, the cross-linking monomers and graft-linking monomers of the cross-linked core comprise 1,3-butandeiol diacrylate and allyl (meth)acrylate. In certain embodiments, the cross-linking monomers and graft-linking monomers are present in the cross-linked core in an amount of from 0.1 to 5 weight %, preferably of from 0.5 to 3 weight %, and more preferably of from 1 to 2 weight %, based on the total weight of the cross-linked core.

In certain embodiments, the cross-linked core of the inventive multi-stage polymer has a calculated $T_g$ of 85° C. or more, −70° C. or more, or −60° C. or more. In certain embodiments, the cross-linked core of the inventive multi-stage polymer has a calculated $T_g$ of −10° C. or less, −30° C. or less, or −40° C. or less.

The first intermediate layer of the inventive multi-stage polymer comprises polymerized units derived from one or more alkyl(meth)acrylate monomers. The alkyl(meth)acrylate monomers comprise linear and branched alkyl(meth) acrylates wherein the alkyl group has from 1 to 12 carbon atoms. Suitable alkyl(meth)acrylate monomers include, for example, methyl methacrylate, ethyl acrylate, butyl acrylate, butyl methacrylate, ethyl hexyl acrylate, cyclopentyl acrylate, cyclohexyl acrylate, benzyl acrylate, benzyl methacrylate, and isooctylacrylate. In certain preferred embodiments, the alkyl(meth)acrylate monomers of the first intermediate layer comprise butyl acrylate and methyl methacrylate. In certain embodiments, the alkyl(meth)acrylate monomers are present in the first intermediate layer in an amount of from 95 to 100 weight %, preferably of from 97 to 99.9 weight %, and more preferably of from 99 to 99.9 weight %, based on the total weight of the first intermediate layer.

In certain embodiments, the first intermediate of the inventive multi-stage polymer further comprises polymerized units derived from one or more cross-linking monomers, graft-linking monomers, and combinations thereof. Suitable cross-linking and graft-linking monomers include, for example, butanediol di(meth)acrylate, ethylene glycol di(meth)acrylate, divinyl benzene, diethylene glycol di(meth)acrylate, diallyl maleate, allylmethacrylate, allyl acrylate, diallyl phthalate, triallyl phthalate, and trimethylolpropane tri(meth)acrylate. In certain embodiments, the cross-linking monomers and graft-linking monomers of the first intermediate layer comprise allyl methacrylate. In certain embodiments, the cross-linking monomers and graft-linking monomers are present in the first intermediate layer in an amount of from 0 to 5 weight %, preferably of from 0.1 to 3 weight %, and more preferably of from 0.1 to 1 weight %, based on the total weight of the first intermediate layer.

In certain embodiments, the first intermediate layer is composed of multiple sub-layers, each of which independently contains polymerized units derived from the monomer compositions described above for the entirety of the first intermediate layer. The first intermediate layer may contain, for example, comprise one, two, three, four, or five sub-layers. The first intermediate layer contains a compositional gradient between the sub-layers such that the $T_g$ transitions from a minimum to a maximum over the width of the entire first intermediate layer. In certain embodiments, the calculated $T_g$ transitions from a lower limit of −30° C., −25° C., −15° C., or 0° C., to an upper limit of 70° C., 55° C., 35° C., or 15° C. While not wishing to be bound by theory, it is believed that the compositional gradient is achieved by the proper selection of and manner and timing of addition of monomers during the emulsion polymerization process used to prepare the first intermediate layer. A multi-stage polymerization process may be used during which monomers are added in stages, rather than all at once, to the emulsion polymerization reactor (or reactor vessel), permitting an interpenetration of one layer into adjacent layers resulting in a $T_g$ gradient over the first intermediate layer.

The second intermediate layer of the inventive multi-stage polymer comprises one or more of alkyl(meth)acrylate monomers, styrenic monomers, and combinations thereof. The alkyl(meth)acrylate monomers comprise linear and branched alkyl(meth)acrylates wherein the alkyl group has from 1 to 12 carbon atoms. Suitable alkyl(meth)acrylate monomers include, for example, methyl methacrylate, ethyl acrylate, butyl acrylate, butyl methacrylate, ethyl hexyl acrylate, cyclopentyl acrylate, cyclohexyl acrylate, benzyl acrylate, benzyl methacrylate, and isooctylacrylate. Suitable styrenic monomers include, for example, styrene, alpha-methylstyrene, and vinyl toluene. In certain preferred embodiments, the alkyl(meth)acrylate monomers of the second intermediate layer comprise butyl acrylate and methyl methacrylate. In certain embodiments, the alkyl(meth)acrylate monomers are present in the second intermediate layer in an amount of from 98 to 100 weight %, preferably of from 98.5 to 99.5 weight %, and more preferably of from 98.7 to 99.3 weight %, based on the total weight of the second intermediate layer.

In certain embodiments, the second intermediate of the inventive multi-stage polymer further comprises polymerized units derived from one or more chain transfer agents. Suitable chain transfer agents include, for example, 1-dodecanethiol, t-dodecanethiol, thioethanol, hexanethiol, mercaptopropionic acid, methyl-3-mercaptopropionate, and butyl-3-mercaptopropionate. In certain preferred embodiments, the chain transfer agents of the second intermediate layer comprise 1-dodecanethiol. In certain embodiments, the chain transfer agents are present in the second intermediate layer in an amount of from 0 to 2 weight %, preferably of from 0.5 to 1.5 weight %, and more preferably of from 0.7 to 1.3 weight %, based on the total weight of the second intermediate layer.

In certain embodiments, the second intermediate layer of the inventive multi-stage polymer has a calculated $T_g$ of 40° C. or more, 45° C. or more, or 65° C. or more. In certain embodiments, the second intermediate layer of the inventive multi-stage polymer has a calculated $T_g$ of 110° C. or less, 95° C. or less, or 80° C. or less.

The shell of the inventive multi-stage polymer comprises one or more of alkyl(meth)acrylate monomers, styrenic monomers, and combinations thereof. The alkyl(meth)acrylate monomers comprise linear and branched alkyl(meth)acrylates wherein the alkyl group has from 1 to 12 carbon atoms. Suitable alkyl(meth)acrylate monomers include, for example, methyl methacrylate, ethyl acrylate, butyl acrylate, butyl methacrylate, ethyl hexyl acrylate, cyclopentyl acrylate, cyclohexyl acrylate, benzyl acrylate, benzyl methacrylate, and isooctylacrylate. Suitable styrenic monomers include, for example, styrene, alpha-methylstyrene, and vinyl toluene. In certain preferred embodiments, the alkyl (meth)acrylate monomers of the shell comprise butyl acrylate and methyl methacrylate. In certain embodiments, the alkyl(meth)acrylate monomers are present in the shell in an amount of from 84 to 98 weight %, preferably of from 85 to 94 weight %, and more preferably of from 86 to 93 weight %, based on the total weight of the second intermediate layer.

The shell of the inventive multi-stage polymers further comprises one or more monomers selected from the group consisting of acid functionalized monomers, hydroxyl-functionalized monomers, and combinations thereof. Suitable examples of functionalized monomers include, for example, acid functionalized monomers and hydroxyl-functionalized monomers. Suitable examples of acid functionalized monomers include, for example, acrylic monomers having one or more carboxyl group, e.g., (meth)acrylic acid, itaconic acid, and phthalic acid. In certain preferred embodiments, the one or more acid functionalized monomers comprise acrylic acid. Suitable examples of hydroxyl-functionalized monomers include, for example, one or more hydroxy-substituted $C_1$-$C_8$ alkyl (meth)acrylates. In certain preferred embodiments, one or more hydroxyl-functionalized monomers comprise hydroxyethyl methacrylate. In certain embodiments, the one or more monomers selected from the group consisting of acid functionalized monomers, hydroxyl-functionalized monomers, and combinations thereof are present in the shell in an amount of from 2 to 16 weight %, preferably of from 3 to 14 weight %, and more preferably of from 5 to 12 weight %, based on the total weight of the shell.

In certain embodiments, the shell of the inventive multi-stage polymers further comprises polymerized units derived from one or more chain transfer agents. Suitable chain transfer agents include, for example, 1-dodecanethiol, t-dodecanethiol, thioethanol, hexanethiol, mercaptopropionic acid, methyl-3-mercaptopropionate, butyl-3-mercaptopropionate. In certain preferred embodiments, the chain transfer agents of the shell comprise 1-dodecanethiol. In certain embodiments, the chain transfer agents are present in the shell in an amount of from 0 to 2 weight %, preferably of from 0.5 to 1.5 weight %, and more preferably of from 0.7 to 1.3 weight %, based on the total weight of the shell.

In certain embodiments, the shell of the inventive multi-stage polymer has a calculated $T_g$ in the range of 40° C. or more, 50° C. or more, or 65° C. or more. In certain embodiments, the shell of the inventive multi-stage polymer has a calculated $T_g$ of 100° C. or less, 90° C. or less, or 80° C. or less.

In certain embodiments, the shell of the inventive multi-stage polymer has a weight average molecular weight ($M_w$) in the range of from 20,000 to 100,000 g/mol, 30,000 to 60,000 g/mol, 40,000 to 60,000 g/mol, or 40,000 to 50,000 g/mol.

In certain embodiments, the inventive multi-stage polymers have a particle size in the range of from 30 to 250 nm, preferably of from 50 to 200 nm, more preferably of from 60 to 175 nm, and even more preferably of from 90 to 150 nm, as measured by a Brookhaven BI-90 Particle Sizer.

Suitable polymerization techniques for preparing the polymers contained in the inventive polymer compositions include, for example, emulsion polymerization and solution polymerization, preferably emulsion polymerization, as disclosed in U.S. Pat. No. 6,710,161. Aqueous emulsion polymerization processes typically are conducted in an aqueous reaction mixture, which contains at least one monomer and various synthesis adjuvants, such as the free radical sources, buffers, and reductants in an aqueous reaction medium. In certain embodiments, a chain transfer agent may be used to limit molecular weight. The aqueous reaction medium is the continuous fluid phase of the aqueous reaction mixture and contains more than 50 weight % water and optionally one or more water miscible solvents, based on the weight of the aqueous reaction medium. Suitable water miscible solvents include, for example, methanol, ethanol, propanol, acetone, ethylene glycol ethyl ethers, propylene glycol propyl ethers, and diacetone alcohol. In certain embodiments, the aqueous reaction medium contains more than 90 weight % water, preferably more than 95 weight % water, and more preferably more than 98 weight % water, based on the weight of the aqueous reaction medium.

The inventive polymer compositions may also contain other optional ingredients that include, for example, plasticizers, antioxidants, UV absorbers and light stabilizers, dyes, pigments, flame retardant agents, and other additives to prevent, reduce, or mask discoloration or deterioration caused by heating, aging, or exposure to light or weathering. The amount of optional ingredients effective for achieving the desired property provided by such ingredients can be readily determined by one skilled in the art.

As noted above, the multi-stage polymer compositions of the present invention have end use application including, for example, as sheets and films in glass laminates and interlayers for use in automotive windows and windshields, and for use in hurricane resistant glass windows and/or doors. The inventive multi-stage polymer compositions can be processed into a film and/or sheet by way of extrusion, calendaring, or injection molding. Sheets and films made from the inventive polymer composition may have any appropriate thickness. In one embodiment, the sheets or films have a thickness of from 150 to 500 microns.

Some embodiments of the invention will now be described in detail in the following Examples.

EXAMPLES

Example 1

Preparation of Exemplary Multi-Stage Polymers

Exemplary multi-stage polymers in accordance with the present invention and comparative multi-stage polymers contain the components recited in Table 1.

TABLE 1

Exemplary and Comparative Multi-Stage Polymers

| Component | E1 (parts by wt) | E2 (parts by wt) | E3 (parts by wt) | C1* (parts by wt) |
|---|---|---|---|---|
| Phase A | | | | |
| Water | 385 | 385 | 385 | 385 |
| 23% Aqueous sodium dodecylbenzenesulfonate | 2.5 | 2.5 | 2.5 | 2.5 |
| Phase B | | | | |
| 0.2% Aqueous iron sulfate heptahydrate | 1.21 | 1.21 | 1.21 | 1.21 |
| 0.5% Aqueous ethylenediaminetetraacetic acid | 1.02 | 1.02 | 1.02 | 1.02 |
| Water | 5 | 5 | 5 | 5 |
| Phase C | | | | |
| Butyl acrylate | 124.4 | 124.4 | 124.4 | 124.4 |
| 1,3-Butanediol diacrylate | 1.26 | 1.26 | 1.26 | 1.26 |
| Allyl methacrylate | 0.63 | 0.63 | 0.63 | 0.63 |
| 23% Aqueous sodium dodecylbenzenesulfonate | 3.9 | 3.9 | 3.9 | 3.9 |
| Water | 35 | 35 | 35 | 35 |
| Phase D | | | | |
| 70% Aqueous tert-Butyl hydroperoxide | 0.38 | 0.38 | 0.38 | 0.38 |
| Water | 14.8 | 14.8 | 14.8 | 14.8 |
| Phase E | | | | |
| Sodium hydroxymethanesulfinate hydrate | 0.47 | 0.47 | 0.47 | 0.47 |
| Water | 23.8 | 23.8 | 23.8 | 23.8 |
| Phase F | | | | |
| Butyl acrylate | 80.9 | 80.9 | 80.9 | 71 |
| Methyl methacrylate | 43.6 | 43.6 | 43.6 | 53.5 |
| Allyl methacrylate | 0.63 | 0.63 | 0.63 | 0.63 |
| 23% Aqueous sodium dodecylbenzenesulfonate | 3.8 | 3.8 | 3.8 | 3.8 |
| Water | 35 | 35 | 35 | 35 |
| Phase G | | | | |
| Butyl acrylate | 2.7 | 5.4 | 5.4 | 2.7 |
| Methyl methacrylate | 50.6 | 48.2 | 48.2 | 50.6 |
| 1-dodecanethiol | 0.57 | 0.57 | 0.57 | 0.57 |
| 23% Aqueous disodium dodecylbenzenesulfonate | 2.3 | 2.3 | 2.3 | 2.3 |
| Water | 13.5 | 13.5 | 13.5 | 13.5 |
| Phase H | | | | |
| Butyl acrylate | 2.7 | 2.7 | 5.4 | 2.7 |
| Methyl methacrylate | 47.6 | 44.4 | 45.5 | 50.6 |
| Hydroxyethyl methacrylate | 3.2 | 6.4 | — | — |
| Acrylic acid | — | — | 2.7 | — |
| 1-dodecanethiol | 0.57 | 0.57 | 0.57 | 0.57 |
| 23% Aqueous sodium dodecylbenzenesulfonate | 2.3 | 2.3 | 2.3 | 2.3 |
| Water | 13.5 | 13.5 | 13.5 | 13.5 |

*Comparative

Exemplary multi-stage polymers E1-E3 in accordance with the present invention, and comparative multi-stage polymer C, were synthesized with appropriate changes in monomer amounts as recited in Table 1 as follows. A reactor equipped with a stirrer and condenser, and blanked with nitrogen, was charged with Mixture A. Mixture B, 7% of Mixture C, 1.7% of Mixture D, and 10.4% of Mixture E were added into the stirred reactor at 85° C. After an exothermic reaction took place and the reactor reached peak temperature, the heating and stirring were continued at 85° C. for 5 minutes. The remainder of Mixture C and 8.7% of Mixture D were gradually added to the reactor over 90 minutes. After the addition was complete, the reactor was kept at 85° C. for 15 minutes. 24.3% of Mixture E was added to the reactor. Mixture F and 24.3% of Mixture D were gradually added to the reactor over 90 minutes. After the addition was complete, the reactor was held at 85° C. for 15 minutes. 21.9% of Mixture E was added to the reactor. Mixture G and 21.9% of Mixture D were gradually added to the reactor over 60 minutes. After the addition was complete, the reactor was held at 85° C. for 15 minutes. The remainder of Mixture E was added to the reactor. Mixture H and the remainder of Mixture D were gradually added to the reactor over 60 minutes. After the addition was complete, the reactor was held at 85° C. for 15 minutes, then cooled to ambient temperature.

Example 2

Particle Size and Solids Content of Exemplary and Comparative Multi-Stage Polymers Exemplary multi-stage polymers E1-E3 and comparative multi-stage polymer C1 as prepared in Example 1 were evaluated for particle size and solids content as shown in Table 2.

TABLE 2

Characterization of Multi-Stage Polymers

| Sample | Particle Size (nm) | Solids Content |
|--------|--------------------|----------------|
| E1     | 122                | 42%            |
| E2     | 120                | 42%            |
| E3     | 120                | 39.3%          |
| C1*    | 127                | 44.8%          |

*Comparative

The volume average particle size was measured on latexes diluted to 0.001% solids and measured using a Brookhaven BI-90 particle size detector, utilizing Dynamic Light Scattering (15° C. and 90° C. scattering angles) and a laser light source. The signal was detected by a photodiode array and the data analyzed with a built in correlator.

Example 3

Adhesion and Haze Characterization of Exemplary and Comparative Multi-Stage Polymers Exemplary multi-stage polymers E1-E3 and comparative multi-stage polymer C1 as prepared in Example 1 were evaluated for adhesion (as measured using a pummel adhesion test) and haze level after polymer isolation, film preparation, and acrylate glass laminate preparation. The emulsions prepared from each of exemplary multi-stage polymers E1-E3 and comparative multi-stage polymer C1 as prepared in Example 1 were isolated by coagulation with $CaCl_2$) solution and dried in an oven under vacuum. The resulting powder was then processed using a Collin Mill (W. H. Collin GmbH Maschienefabrik) at 175° C. for 3 minutes. After milling was completed, the molten polymer was peeled from the metal rolls and cooled down to provide films with a thickness in the range of from 350 to 400 microns, as measured by a micrometer. The resulting films prepared from exemplary multi-stage polymers E1-E3 and comparative multi-stage polymer C1 were evaluated for haze level in accordance with ASTM D1003 using a Hazegard Plus (BYK-Gardner GmbH). The typical commercial performance requires haze values of 2% or less. The results of the haze characterization are shown in Table 3.

To test adhesion of the multi-stage polymers films to glass sheets, the exemplary and comparative acrylic films were sandwiched between two pieces of 3.2 mm thick glass, with dimension of the laminates at 10.2 cm×30.5 cm, in an autoclave at a temperature of 160° C. The resulting glass laminates containing interlayer films prepared from exemplary multi-stage polymers E1-E3 and comparative multi-stage polymer C1 were evaluated for adhesion of the multi-stage polymer to the glass sheets and measured using a pummel adhesion test. The test includes pummeling the glass laminates with a 1 pound hammer to shatter the glass. Adhesion was evaluated by the amount of exposed shattered glass pieces that have fallen off of the polymer interlayer. All broken glass un-adhered to the interlayer film is removed. The glass left adhered to the interlayer film was visually compared with a set of standards of known pummel scale. A higher the pummel value indicates a high amount of glass that remained adhered to the interlayer film. For example, a pummel adhesion value of zero means that no glass remained adhered to the interlayer film, and a pummel value of 10 indicates that 100% of the glass remained adhered to the interlayer film. Typically, a pummel value of 2-7 is desirable. The results of the pummel adhesion test are shown in Table 3.

TABLE 3

Pummel Adhesion and Haze Characterization of Multi-Stage Polymers

| Sample | Pummel Value | Haze (%) |
|--------|--------------|----------|
| E1     | 2            | <1.0%    |
| E2     | 3            | <1.0%    |
| E3     | 6            | <1.2%    |
| C1*    | 0            | 1.3%     |

*Comparative

The results of the haze characterization demonstrate that films prepared in accordance with the present invention, i.e., those prepared from exemplary samples E1-E3 which contain an acid-functionalized monomer in the shell of the multi-stage polymer, demonstrated a haze value that is on par with, if not better than, the closest comparative, i.e., a film prepared from comparative sample C1 which omitted an acid-functionalized monomer in the shell of the multi-stage polymer. The results of the glass adhesion pummel test indicate that glass laminates prepared in accordance with the present invention, i.e., those containing interlayer films prepared from exemplary samples E1-E3 which contain an acid-functionalized monomer or hydroxyl-functionalized monomer in the shell of the multi-stage polymer, demonstrated a significantly better glass adhesion pummel value than the closest comparative, i.e., a glass laminate containing a film prepared from comparative sample C1 which omitted an acid-functionalized or hydroxyl-functionalized monomer in the shell of the multi-stage polymer.

What is claimed is:

1. A polymer composition comprising a multi-stage polymer comprising:
   (a) 30 to 40 weight % of a cross-linked core, based on the total weight of the multi-stage polymer, comprising polymerized units derived from (i) 95 to 99.9 weight % of one or more alkyl(meth)acrylate monomers, and (ii) 0.1 to 5 weight % of one or more cross-linking monomers, graft-linking monomers, and combinations thereof, based on the total weight of the cross-linked core;
   (b) 30 to 40 weight % of a first intermediate layer, based on the total weight of the multi-stage polymer, comprising polymerized units derived from (i) 95 to 100 weight % of one or more alkyl(meth)acrylate monomers, and (ii) 0 to 5 weight % of cross-linking monomers, graft-linking monomers, and combinations thereof, based on the total weight of the first intermediate layer;
   (c) 10 to 20 weight % of a second intermediate layer, based on the total weight of the multi-stage polymer, comprising polymerized units derived from (i) 98 to 100 weight % of one or more alkyl(meth)acrylate monomers, styrenic monomers, and combinations thereof, and (ii) 0 to 2 weight % of one or more chain transfer agents, based on the total weight of the second intermediate layer; and
   (d) 10 to 20 weight % of a shell, based on the total weight of the multi-stage polymer, comprising polymerized units derived from (i) 84 to 98 weight % of one or more alkyl(meth)acrylate monomers, styrenic monomers, and combinations thereof, (ii) 2 to 16 weight % of one or more monomers selected from the group consisting of acid functionalized monomers, hydroxyl-functionalized monomers, and combinations thereof, and (iii) 0 to 2 weight % of one or more chain transfer agents, based on the total weight of the shell.

2. The composition of claim 1, wherein the one or more alkyl(meth)acrylate monomers of the cross-linked core, first intermediate layer, second intermediate layer, and shell are selected from the group consisting of methyl methacrylate, ethyl acrylate, butyl acrylate, butyl methacrylate, ethyl hexyl acrylate, cyclopentyl acrylate, cyclohexyl acrylate, benzyl acrylate, benzyl methacrylate, isooctylacrylate, and combinations thereof.

3. The composition of claim 1,
   wherein the one or more cross-linking monomers, graft-linking monomers, and combinations thereof of the first intermediate layer are present in an amount of from 0.5 to 5 weight %, based on the total weight of the first intermediate layer, and
   wherein the one or more cross-linking monomers, graft-linking monomers, and combinations thereof of the cross-linked core and first intermediate layer are selected from the group consisting of butanediol di(meth)acrylate, ethylene glycol di(meth)acrylate, divinyl benzene, diethylene glycol di(meth)acrylate, diallyl maleate, allylmethacrylate, diallyl phthalate, triallyl phthalate, trimethylolpropane tri(meth)acrylate, and combinations thereof.

4. The composition of claim 1,
   wherein the one or more chain transfer agents of the second intermediate layer are present in an amount of from 0.5 to 1.5 weight %, based on the total weight of the second intermediate layer, and
   wherein the one or more chain transfer agents of the shell are present in an amount of from 0.5 to 1.5 weight %, based on the total weight of the shell, and
   wherein the one or more chain transfer agents of the second intermediate layer and shell comprises 1-dodecanethiol.

5. The composition of claim 1, wherein the one or more monomers selected from the group consisting of acid functionalized monomers, hydroxyl-functionalized monomers, and combinations thereof comprises one or more of acrylic acid and hydroxyl ethyl methacrylate.

6. The composition of claim 1, wherein the one or more alkyl(meth)acrylate monomers of the cross-linked core, first intermediate layer, second intermediate layer, and shell are selected from the group consisting of butyl acrylate, methyl methacrylate, and combinations thereof.

7. The composition of claim 3, wherein the one or more cross-linking monomers, graft-linking monomers, and combinations thereof of the cross-linked core and first intermediate layer are selected from the group consisting of 1,3-butanediol diacrylate, allyl methacrylate, and combinations thereof.

8. An article of manufacture comprising the polymer composition of claim 1, wherein the article of manufacture is selected from the group consisting of a film and a sheet.

9. A polymer composition comprising a multi-stage polymer comprising:
   (a) 30 to 40 weight % of a cross-linked core, based on the total weight of the multi-stage polymer, comprising polymerized units derived from (i) 95 to 99.9 weight % of butyl acrylate, and (ii) 0.1 to 5 weight % of 1,3-butandeiol diacrylate and allyl methacrylate, based on the total weight of the cross-linked core;
   (b) 30 to 40 weight % of a first intermediate layer, based on the total weight of the multi-stage polymer, comprising polymerized units derived from (i) 97 to 99.9 weight % of butyl acrylate and methyl methacrylate, and (ii) 0.1 to 3 weight % of allyl methacrylate, based on the total weight of the first intermediate layer;
   (c) 10 to 20 weight % of a second intermediate layer, based on the total weight of the multi-stage polymer, comprising polymerized units derived from (i) 98.5 to 99.5 weight % of butyl acrylate and methyl methacrylate, and (ii) 0.5 to 1.5 weight % of 1-doecanethiol, based on the total weight of the second intermediate layer; and
   (d) 10 to 20 weight % of a shell, based on the total weight of the multi-stage polymer, comprising polymerized units derived from (i) 85 to 94 weight % of butyl acrylate and methyl methacrylate, (ii) 3 to 14 weight % of one or more monomers selected from the group consisting of acrylic acid, hydroxyethyl methacrylate, and combinations thereof, and (iii) 0.5 to 1.5 weight % of 1-dodecanethiol, based on the total weight of the shell.

* * * * *